Jan. 20, 1959 E. J. SVENSON 2,869,500
HYDRAULIC VALVE CONTROL FOR BILGE DISCHARGE
Original Filed July 22, 1949 2 Sheets-Sheet 1
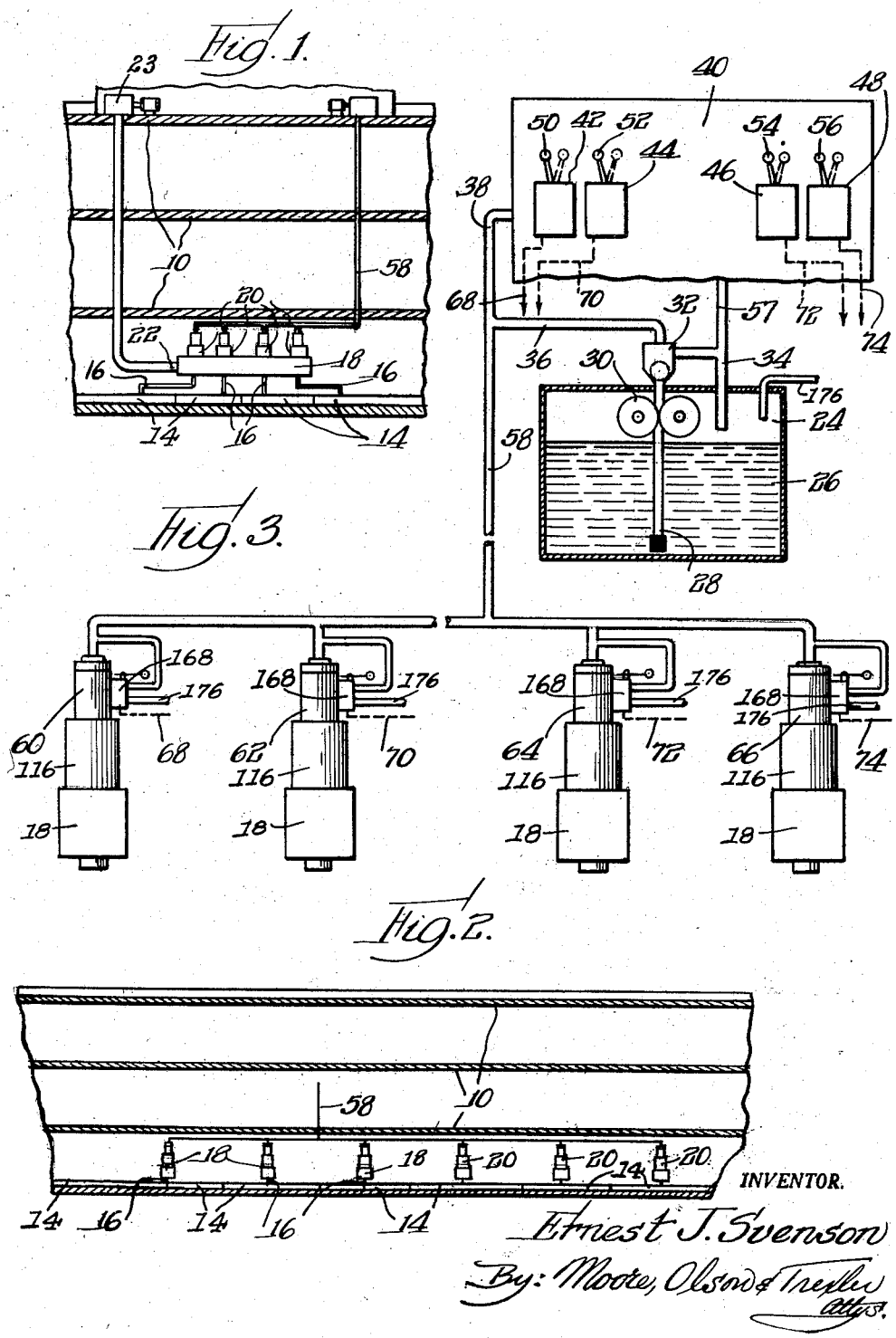
INVENTOR.
Ernest J. Svenson
By: Moore, Olson & Trexler
attys.

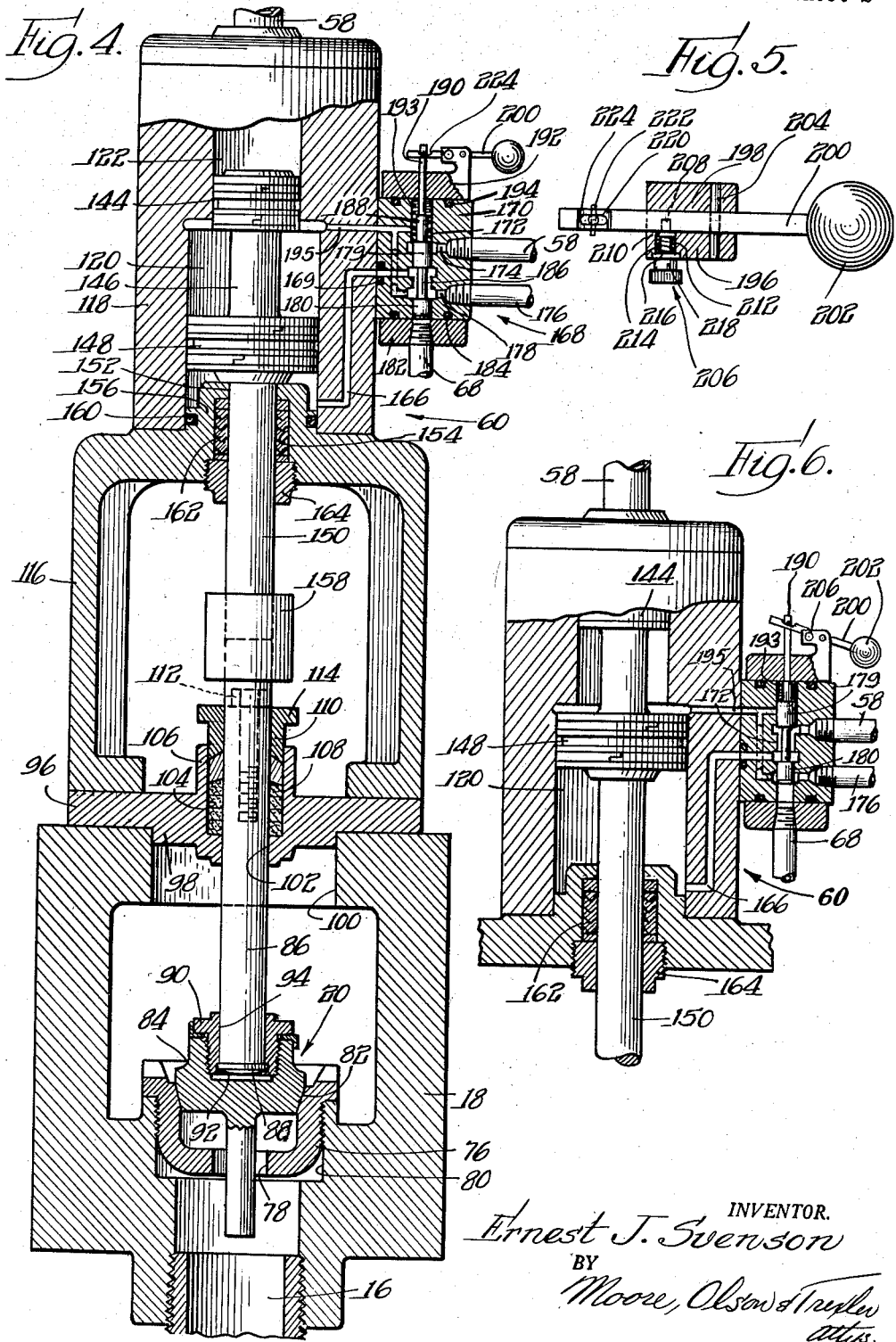

United States Patent Office 2,869,500
Patented Jan. 20, 1959

2,869,500

HYDRAULIC VALVE CONTROL FOR BILGE DISCHARGE

Ernest J. Svenson, Rockford, Ill.

Continuation of application Serial No. 106,197, July 22, 1949. This application November 21, 1956, Serial No. 623,611

9 Claims. (Cl. 114—183)

This invention relates to valve control mechanisms and more particularly to hydraulically operable mechanisms for shifting remotely positioned valves. This is a continuation of my co-pending application Serial No. 106,197, filed July 22, 1949, now abandoned.

There are many applications in which it is desirable to control the operation of valves from a remote point, as for example, in chemical plants where the conduits carrying fluids are relatively inaccessible or in hydraulic presses where it is desirable to control a number of operations from a common point. Control of the flow of water to and from the bilges of a ship is an application to which my invention is well adapted and has been chosen for purposes of illustration. In such installations, the valves are frequently subject to corrosion or gumming so that they become stuck whereby a positive substantially unyielding force means is required for insuring proper and safe operation of the valve.

Often it is desirable to remove all or a part of the water from the bilges of a ship while at other times it is desirable to pump water into the bilges as for ballast purposes. Generally, the bilges are located at the bottom of a ship and are relatively inaccessible. If it were necessary to operate the valves at their various locations, a great amount of effort would be entailed in going from one to the other, and an intolerable time lag would be encountered between the time it was first wished to actuate the valve and the time the valve was actuated.

In the past remote control of valves has been attempted by the use of reach rods. To enable a number of valves at different locations to be operated from a central control point the reach rods have often been flexible shafts. In the type of ship chosen for example, the control room is generally located 50 feet or more above the valve position in the bilge, and is furthermore displaced laterally a distance on the order of 30 feet. When it is considered that the various bilges in a ship may be located 75 feet apart, it may be readily seen that extremely long reach rods were required, often making bends of up to 90 degrees. It is apparent that the friction between these flexible reach rods and their supports was very great, and there was an enormous loss of power. The sea water which passes to and from the bilges through the various valves is quite corrosive, and in addition tends to deposit sticky or gummy substances on the valve, and as a result the valves frequently stick. Due to the enormous power loss in flexible reach rods it has often been completely impossible to open sticky valves from a remote location by such means.

Remote control of valves has been attempted with compressed air but has been unsatisfactory as it provides a yieldable or compressible force and has often been unable to open sticky valves. Another disadvantage of compressed air is that, in the event a sticky valve is encountered, a large volume of air must be delivered to raise the pressure within the system sufficiently to start the valve after which the resistance or load provided by the valve may drop considerably so that the expanding air in the system may shift the valve at high speed and thus create inertia forces which will cause injury to the valve structure. Furthermore, it is imperative that the position of the valve be known in the control room and indication is unreliable with an air medium. If a valve control was in an open position in the control room, it was no assurance that the valve itself would be open because if it were stuck the air would merely compress enough to compensate for the difference in the control position.

Among the important objects of this invention is the provision of a means for solving the problems noted above, namely, the provision of positive substantially unyielding force means for actuating valves from a remote location without unnecessary loss of power and the provision of a positive indication of the valve position.

A more specific object of the present invention is to provide novel hydraulic means for meeting the above named objectives.

It has been contemplated that it would be possible to provide a hydraulic line from a control line directly to an actuating mechanism associated with each valve. The size of each such hydraulic line would necessarily vary with the size of the valve and it is apparent that this would entail a large number of hydraulic lines of different sizes, all relatively large.

It is accordingly an object of the present invention to provide valve control means operable from a distant point, each of such means being connected to the remote point by a small hydraulic line of standard size.

A further object of this invention is to provide a hydraulic remotely operable valve control means requiring a minimum of hydraulic fluid.

A more specific object of this invention is to accomplish this last named object by means of a differential piston, the fluid being forced out of one end of the piston returning to the hydraulic system connected to the other end of said piston.

An important object of this invention is to provide means for actuating a valve at the location of the valve as well as from a remote location.

A further object of the present invention is to provide a novel hydraulic system for actuating a valve of the type contemplated herein, which hydraulic system is constructed so as to provide an indication of the position of the valve both at a location adjacent the valve and at a location remote from the valve.

Other and further objects and advantages of the present invention will be apparent to those skilled in the art from the following description when taken in conjunction with the accompanying drawings in which:

Fig. 1 is a fragmentary cross sectional, somewhat schematic view taken through a ship embodying my present invention;

Fig. 2 is a fragmentary longitudinal sectional view of a portion of the ship shown in Fig. 1;

Fig. 3 is a flow diagram embodying the invention;

Fig. 4 is a side view mostly in section showing a valve and its associated actuating mechanism;

Fig. 5 is a top plan view showing the mechanism for operating the valve at the location of valve; and Fig. 6 is a fragmentary sectional view showing the valve and actuating mechanism in a different position from that shown in Fig. 4.

In Figs. 1 and 3 is shown somewhat schematically an installation of the present invention in a ship. The ship may have one or more decks 10. At the upper part of the ship are the various bridges and control rooms wherein a valve control panel to be described later may be located. A bilge 14 at the bottom of the ship, which is preferably compartmented in the usual way, has been chosen for illustration, although it is to be appreciated that water or other fluids may be located in other compartments at various locations and elevations throughout the ship; for example, water stored for fire fighting purposes, and my valve actuators would be installed at all such locations. Pipe lines 16 may lead from a group of bilge compartments or in a small ship from all of the bilge compartments to a manifold 18 having valves 20 and an inlet-outlet pipe 22 leading to a pump 23. When it is desired to empty one or more of the bilge compartments the valves 20 corresponding to these compartments are opened and the pump is actuated so as to draw water through the lines 16 to the manifold 18 and out through the pipe 22 to be pumped out of the ship. If it is desired to pump water into the bilges the pump may be actuated to pump water through the pipe 22 into the manifold 18. With a ship of considerable size there will generally be several manifolds as shown in Fig. 2 so that pipe lines from the bilge compartments to the manifold need not be overly long and the manifolds need not be of excessive size.

The hydraulic system utilized in this invention is best seen in Figs. 3 and 4. A reservoir 24 contains hydraulic fluid 26 which is pumped through an intake strainer 28 by means of a pair of low capacity high pressure pumps 30, which are preferably gear pumps, to an accumulator 32. One of the pumps is operated continuously to maintain hydraulic pressure and both may be actuated if necessary to maintain hydraulic pressure when a number of valves are opened. It is to be appreciated that the foregoing parts may be provided in duplicate for standby service or to provide more fluid and higher pressures when an unusually large demand is made on the system. The accumulator 32 has a by-pass valve which may be set at any desirable pressure, as for instance from 200 to 600 pounds per square inch, to pass fluid through a drain line 34 leading to the reservoir 24. From the accumulator a fluid power line 36 leads to a junction point from which a fluid power line 38 leads to a control panel 40 in a valve control room as previously mentioned. On the control panel are situated any suitable number of control valves 42, 44, 46 and 48 having actuating handles 50, 52, 54 and 56 respectively. Although but four control valves are shown in Fig. 3 it is apparent that any number of such valves may be utilized, there being one to correspond with each bilge valve. When any of the valve handles 50–56 is in the leftmost position shown in solid lines in Fig. 3 the control valve of which that handle is a part is in open position, whereas when it is in its furthermost position to the right the valve is closed. To accommodate hydraulic fluid lost by leakage and by actuation of these valves a drain line 57 is provided from the valves 42–48 leading to the drain line 34 and hence to the reservoir 24.

From the junction point of the power lines 36 and 38 another hydraulic power lines 58 leads downward toward the bilge 14 and splits off to valve actuators 60, 62, 64 and 66 associated with the various valves 20, all of these valve actuators, of which there is any desirable number, being connected in parallel to the hydraulic power line. Between each of the valve controls 42–48 and valve actuators 60–66 is a pilot line 68, 70, 72 and 74 shown in incomplete dotted lines in Fig. 3. Each of these pilot lines is utilized to actuate a pilot valve as will be explained subsequently and as little force or fluid is used to actuate the pilot valve, the pilot lines 68–74 may be of small diameter.

As each of the valve actuators is the same except for size, only the actuator 60 will be described, it being understood that this description applies to all of the actuators. In Fig. 4 one of the valves 20 is shown in place in the manifold 18 with one of the pipe lines 16 threaded into an aperture in the manifold and opening into the bottom of the valve. A cup-shaped member 76 having an axial aperture 78 is threaded into an aperture 80 in the manifold in line with the bilge pipe 16. The member 76 is provided near its upper periphery with a valve seat 82 and an axially shiftable cooperable valve member 84 fits on this seat when the valve is in closed position. A reciprocable valve stem 86 having a flange 88 at its lower end is secured to the valve member 84 by means of a nut-like member 90 having an enlarged portion 92 at the lower end of an axial bore 94.

The upper part 96 of the valve 20 of the actuator 60 is secured to the top of the manifold in any suitable manner with a depending portion 98 fitting within an aperture 100 in the top of the manifold and co-axial with the bilge pipe 16. The part 96 has an aperture 102 in its depending portion of substantially the same diameter as the valve stem 86. The aperture 102 is enlarged to form an aperture 104 of large diameter, part of this aperture being in an upstanding portion 106 of the valve part 96. In the aperture 104 and surrounding the valve stem 86 may be placed packing 108 to prevent axial leakage along the valve stem and the packing may be secured in place by a bushing 110 extending downward into the aperture 104. The bushing may be held in place by any suitable means, such as bolts 112 passing through a flange 114 at the upper portion of the bushing 110 and threaded into the upper part 96 of the valve.

An actuator support 116 which is secured in any desirable fashion atop the upper part 96 of the valve carries the actuator 60 at its upper extremity and secured thereto in any desirable fashion. The hydraulic actuator 60 includes a cylindrical casing 118 having an axial bore or cylinder 120 of relatively large diameter in its lower portion communicating directly with a co-axial cylinder 122 of smaller diameter at the upper end of the casing 118. A relatively small piston 144 fits within the cylinder 122 and is secured by a rod or shaft 146 to a larger piston 148 fitting within the lower cylinder 120. A piston rod 150 extends downwardly through a small aperture 152 and a larger aperture 154 in an upstanding central portion 156 of the actuator support and has its lower extremity adjacent the upper extremity of the valve stem 86 to which it is rigidly secured by a coupling 158 in any desirable manner including threadedly engaging the piston rod 150 and valve stem 86. Leakage between the upstanding portion 156 of the actuator support and the casing 118 is prevented by a sealing ring 160 or the like placed therebetween. Axial leakage along the piston rod 150 is precluded by packing 162 secured within the aperture 154 by means such as a nut 164 threaded into a slightly enlarged portion of the aperture 154. Adjacent the lower end of the cylinder 120 an inlet-outlet line 166 leads to a pressure sensitive pilot mechanism 168, a sealing ring 169 preventing radial leakage between the pilot mechanism 168 and the casing 118. The top of the upper cylinder 122 and hence the upper face of the piston 144 are preferably open to the hydraulic power line 58 to normally urge the valve actuator downward, but it is contemplated that the downward force could be supplied by a coil spring located in the cylinder 122. It is to be noted that the differential piston is arranged so that hydraulic pressure applied to the large end creates a relatively great force for shifting the valve 84 from the valve seat even in the event the valve member 84 is stuck. Furthermore, when the pressure against the large piston end is relieved, the relatively small force created by the pressure against the smaller end of the differential piston assembly serves to move or hold the valve 84 against the valve seat effectively but without substantial danger of injury to the valve and valve seat.

The pilot mechanism 168 comprises a body portion 170 having an axial bore 172 therethrough, the bore being of different diameters at different points, as may readily be seen in Figs. 4 and 6. The power line 58 enters the body portion 170 from the side and the hydraulic fluid in the line has access through a transverse bore 174 to the bore 172. A lower drain line 176 communicates by means of a transverse bore 178 with another portion of the bore 172. Upper and lower pilot pistons 179 and 180 fit within the aperture 172, the lower of these pistons having its lower face in communication with the hydraulic fluid in the pilot line 68 which is threaded into or otherwise secured to a bottom portion 182 secured in any suitable fashion to the body member 170, an axial ring 184 of suitable construction preventing radial leakage between the members 182 and 170. A piston rod 186 separates the pilot pistons 179 and 180 and may be formed integral therewith. A piston rod 188 of relatively large diameter extends upwardly from the piston 179 and is formed integral with a control rod 190 of reduced diameter which extends upward through a cap 192. The cap 192 is secured to the body 170 in any desirable manner with a sealing ring 194 interposed therebetween to prevent axial leakage. A coil spring 193 is placed within the aperture 172 abutting against the cap 192 and piston 179 so as to normally force the latter downward. It is to be noted that the piston 179, when in the position shown in Fig. 4 is disposed so that its peripheral surface blocks the power inlet bore 174 so that the pressure of hydraulic fluid in the bore 174 does not substantially restrain shifting of the pilot pistons. Thus, the force required to raise the pilot pistons need only be sufficient to overcome the spring 193. A drain line 195 is provided running from the tops of cylinders 120 and 172 to a point in the cylinder or bore 172 adjacent the drain line 176 so that any fluid leaking into these spaces past the various cylinders cannot prevent upward movement of the cylinders. As shown in Figs. 4 and 6, the lower end of the drain line 195 communicates with an annular enlargement of the bore 172, and the drain line 176 also communicates with this annular enlargement. Thus communication is always established between the drain lines 176 and 195, regardless of the position of the pilot piston 180. An upper extension of the cap 192 is bifurcated to form a pair of arms 196 and 198. A manual control handle 200 having a knob 202 at one end is located between the arms 196 and 198 and is pivotally secured thereto by means of a pivot pin 204 passing through both arms and the handle. A locking mechanism 206 is located in the arm 196 and comprises a pin 208 receivable in an aperture in the handle 200. The pin 208 has a collar 210 spaced from its extremity and a coil spring 214 is compressed between the collar 210 and a nut-like member 216 threaded into the aperture 212 to bias the pin 208 toward the handle 200 at all times. A handle 218 is provided to retract the pin 208 against the action of the spring 214 so that the handle 200 may be moved if desired. An elongated vertical aperture 220 is provided in the handle 200 to accept the control rod 190 which has a transverse pin 222 cooperable with a scalloped portion 224 of the top surface of the handle 200. Due to the particular connection between the control rod 190 and the handle 200 it is possible for the control rod to rise without disturbing the position of the handle and it is also possible for the control rod to be raised by the handle.

If it is desired to operate the valve 20 from a distant point the handle 50 of the control 42 is moved to the open position. This applies pressure from the hydraulic power line 38 to the pilot line 68 and raises the pilot pistons 180 and 179 to the position shown in Fig. 6, upward movement of these pistons being stopped by abutment of the shoulder between the piston rod 188 and control rod 190 against the cap 192. The drain 176 is sealed from the power line 58 and the line 166 by the piston 180 and the power line 58 communicates through the bore or cylinder 172 to the line 166 and to the lower part of the cylinder 120. At the same time, the drain 176 remains in communication with the drain line 195. The pressure from the hydraulic power line 58 against the upper face of the piston 144 has prior to this time kept the valve 20 in a closed position but as the area of the lower face of the piston 148 is greater than the area of the upper face of the piston 144, a larger force is developed than the force urging the piston 144 downward and the two pistons and piston rod 150 move upward to the position shown in Fig. 6 to lift the valve stem 86 and open the valve 20 without the necessity of having a valve associated with the upper piston 144. The top of the piston 144 acts as a stop so that the piston 148 does not move upward far enough to close off the drain line 195 but instead leaves some clearance. It is apparent that the relative sizes of the pistons 144 and 148 will be governed by the size of the valve to be opened and the degree of stickiness liable to be encountered. It is to be noted that the volume of hydraulic fluid filling the cylinder 120 need not be moved in its entirety from the accumulator 32 as a sizable portion of it is pumped from the cylinder 122 into the hydraulic power line 58 by the upward movement of the piston 144. When it is desired to again close the valve, the handle 50 of the control 42 is moved to closed position and hydraulic pressure is no longer applied to the pilot line 68. The spring 193 then forces the pilot pistons 179 and 180 downward to the position shown in Fig. 4, sealing off the power line and opening the lower portion of the cylinder 120 to the lower drain 176. It is to be noted that when the pilot pistons are in the raised position the hydraulic fluid between the adjacent or inner ends of the pilot pistons acts against these ends in opposite directions with substantially equal force. As a result the pressure in the power line in no way acts to urge the pilot piston assembly in either direction or to hold the pilot piston assembly in the upper position so that the spring may easily shift the pilot piston assembly downwardly when the pressure in the line 68 is relieved. As pressure is no longer applied against the lower face of the piston 148, the pressure from the direct power line 58 on the upper face of the piston 144 pushes the pistons, the piston rod 150, the valve stem 86 and the valve member 84 downward to close the valve. The fluid in the lower part of the cylinder 120 is forced out through the line 166, the cylinder 172 and lower drain 176 and returned to the reservoir 24.

The valve may also be actuated directly at the manifold by pushing down on the knob 202 of the handle 200 after retracting the pin 208 by means of the handle 218 to lift the control rod 190 and move the pilot pistons to the same position which they occupy when forced upwards by pressure from the pilot line 68.

It is apparent that I have herein provided a means for operating a valve from a distant point or from a near point. The operation is simple and sure. A minimum of transmission loss is engendered, and a positive indication of the valve position appears at the control point. It is further apparent that through the use of a single hydraulic power supply line from the valve control line to the vicinity of the bilge and of a differential piston in pumping a volume of fluid back into the power supply line a minimum of hydraulic fluid is required.

Although I have shown and described a particular embodiment of my invention, it is apparent that my invention has utility in other installations such as chemical plants and oil fields and that changes may be made in the form, construction and arrangement of the parts without departing from the spirit of the invention or sacrificing any of its attendant advantages and the right is hereby reserved to make all such changes as fairly fall within the scope of the appended claims.

The invention is claimed as follows:

1. In a ship, a plurality of relatively inaccessible bilge compartments, a manifold, means for maintaining a predetermined pressure in said manifold, means including a plurality of valves each interconnecting one of said bilge compartments and said manifold to control the egress and ingress of water from and to said bilge compartments, a plurality of valve actuators mounted on said manifold and each mechanically linked to one of said valves, each of said valve actuators being operable by hydraulic fluid under pressure, a source of hydraulic fluid, means for applying pressure to said hydraulic fluid, means including valve means connecting each of said actuators to said pressure applying means, a plurality of remote control means connected to said pressure applying means and each including a valve remote from said valve actuators and pressure sensitive means adjacent each valve actuator for operating said valve actuators and a hydraulic line linking each of said pressure sensitive means and one of said remote control valves for selectively applying pressure to said pressure sensitive means whereby to operate said valve actuators from a remote location in said ship.

2. In a ship, a plurality of relatively inaccessible bilge compartments, a manifold in said ship adjacent said bilge compartments, means for maintaining a predetermined pressure in said manifold, means interconnecting said bilge compartments and said manifold including a plurality of valves on said manifold and each controlling the egress and ingress of water from and to one of said bilge compartments, a plurality of valve actuators mounted on said manifold and each mechanically linked to one of said valves, each of said valve actuators including a differential piston having a larger diameter end and a small diameter end and operable by hydraulic fluid under pressure, a source of hydraulic fluid, relatively low capacity high pressure pump remotely disposed relative to said valve actuators for supplying hydraulic fluid under pressure thereto, a relatively large diameter hydraulic power line interconnecting said pump and each of said valve actuators, said power lines at all times being in open communication with the small end of each of said differential pistons, a plurality of hydraulically operable pilot means each associated with and disposed adjacent to one of said valve actuators, a drain line from each of said pilot means to said source to return hydraulic fluid to said source, means in each of said pilot means selectively interconnecting the large end of said differential piston with said hydraulic power line adjacent said small end of the differential piston and said drain line, the ends of each of said differential pistons thereby being in open communication with one another when said power line is interconnected with the large end of that piston so that fluid expelled by the small end augments fluid in said power line passing to the large end, remote control means, and means linking said remote control means to the interconnecting means of each of said pilot means for operating said pilot means selectively to actuate said valves from a distant location.

3. In a system for controlling fluid flow including a valve seat and a valve member shiftable toward and away from said seat and susceptible to sticking against said seat, a differential actuator piston having opposite relatively large and small diameter ends and rigidly connected to said valve member for positively shifting said valve member away from said valve seat when hydraulic liquid under pressure is applied to said large piston end and for positively moving said valve member toward and against said valve seat when hydraulic liquid under pressure is applied only to said small piston end, remotely positioned high pressure and relatively low capacity means for supplying hydraulic liquid under pressure from a liquid reservoir, power conduit means connected with said liquid supply means and continuously in open communication with said small piston end, an actuator control valve body adjacent said piston and communicating with said large piston end and with said power conduit substantially at said small piston end, a drain line extending from said control valve body to said reservoir, piston valve means axially sildable in said control valve body and including a pair of connected axially arranged portions respectively having their sides blocking communication between said power conduit and said large piston end when in one position and blocking communication between said large piston end and said drain line when in a second position, said piston valve means providing a passageway between said portions for connecting said power conduit and said large piston end when said piston valve means is in said second position so that the hydraulic fluid under pressure from the power conduit is ineffective for shifting the said piston valve means, spring means normally biasing said piston valve means toward one of said positions, a remotely positioned control valve connected with said liquid supply means, and a hydraulic line between said remotely positioned control valve and said actuator control valve body for directing hydraulic liquid under pressure to shift said piston valve means to the other of said positions.

4. A system, as defined in claim 3, wherein valve portions are disposed with a space therebetween, which space provides said passageway for connecting said power conduit and said large piston end when said piston valve portions are in said second position and also provides for communication between said large piston end and said drain line wherein said piston valve portions are in said first position, opposing ends of said piston valve portions having substantially equal areas so that hydraulic liquid flowing through said space is ineffective to shift said piston valve assembly.

5. A system, as defined in claim 3, which includes mechanical means substantially at said control valve body and connected with said piston valve means and operable for shifting said piston valve means against the action of said biasing means from said one position to the other of said positions.

6. A system, as defined in claim 5, wherein said remotely located control valve means is a two-position valve and includes an actuating lever which by its position provides an indication of the position of said differential piston.

7. A system, as defined in claim 5, wherein said mechanical means includes an actuating lever which by its position provides an indication of the position of said differential piston.

8. In a system for controlling fluid flow including a valve seat and a valve member shiftable toward and away from said seat and susceptible to sticking against said seat, a differential actuator piston having opposite relatively large and small diameter ends and rigidly connectable to said valve member for selectively positively shifting said valve member away from said valve seat and for positively moving said valve member toward and against said valve seat, remotely positioned high pressure and relatively low capacity means for supplying hydraulic liquid under pressure from a liquid reservoir, power conduit means connected with said liquid supply means and continuously in open communication with said small piston end, an actuator control valve body adjacent said piston and having a bore therein, said control valve body including passageways respectively communicating with said large piston end and with said power conduit adjacent said small piston end and with axially spaced side portions of said bore, a drain line extending from another side portion of said bore to said reservoir, piston valve means axially slidable in said bore and including a pair of axially arranged connected pistons with a space therebetween respectively having their sides blocking communication between said power conduit and said large piston end passageway when in one position and blocking communication between said large piston end passageway and said drain line when in a second position, the space between said pistons providing a passageway for connecting said power conduit and said large piston end passageways when said piston valve assembly is in said second position, spring means normally biasing said piston valve means toward one of said positions, mechanical means at said valve body and connected with said piston valve means for shifting said piston valve means toward the other of said positions, a remotely positioned control valve connected with said liquid supply means, and a hydraulic line between said remotely positioned control valve and said actuator control valve body for directing hydraulic liquid under pressure to shift said piston valve means to said other of said positions.

9. In a system for controlling fluid flow including a valve seat and a valve member shiftable toward and away from said seat and susceptible to sticking against said seat, a differential actuator piston having opposite relatively large and small diameter ends and rigidly connectable to said valve member for selectively positively shifting said valve member in one direction when hydraulic liquid under pressure is applied to said large piston end and for positively moving said valve member in the opposite direction when hydraulic liquid under pressure is applied only to said small piston end, remotely positioned high pressure and relatively low capacity means for supplying hydraulic liquid under pressure from a liquid reservoir, power conduit means connected with said liquid supply means and continuously in open communication with said small piston end, an actuator control valve body adjacent said piston and communicating with said large piston end and with said power conduit substantially at said small piston end, a drain line extending from said control valve body to said reservoir, piston valve means in said control valve body and including a pair of axially arranged portions respectively having their sides for blocking communication between said power conduit and said large piston end when in one position and blocking communication between said large piston end and said drain line when in a second position, said piston valve means including a passageway through a said portion thereof for connecting said power conduit and said large piston and when said piston valve assembly is in said second position in a manner so that hydraulic fluid under pressure from said power conduit is ineffective for shifting the piston valve means, spring means normally biasing said piston valve means toward one of said positions, mechanical means at said valve body and connected with said piston valve means for shifting said piston valve means toward the other of said positions, a remotely positioned control valve connected with said liquid supply means, and a hydraulic line between said remotely positioned control valve and said actuator control valve body for directing hydraulic liquid under pressure to shift said piston valve means to said other of said positions.

References Cited in the file of this patent

UNITED STATES PATENTS

| | | |
|---|---|---|
| 1,480,937 | Gottschalk | Jan. 15, 1924 |
| 2,206,957 | Hose | July 9, 1940 |
| 2,397,814 | Seborg et al. | Apr. 2, 1946 |
| 2,573,368 | Seborg | Oct. 30, 1951 |

FOREIGN PATENTS

| | | |
|---|---|---|
| 644,689 | Germany | June 14, 1937 |